US005525796A

United States Patent [19]

Haake

[11] Patent Number: 5,525,796
[45] Date of Patent: Jun. 11, 1996

[54] FIBER OPTIC SENSING APPARATUS FOR DETECTING A FRACTURE IN A METALLIC WORKPIECE AND AN ASSOCIATED METHOD OF ATTACHING A FIBER OPTIC SENSING ELEMENT TO THE METALLIC WORKPIECE

[75] Inventor: John M. Haake, St. Charles, Mo.

[73] Assignee: McDonnell Douglas Corporation, St. Louis, Mo.

[21] Appl. No.: 263,810

[22] Filed: Jun. 22, 1994

[51] Int. Cl.⁶ .................................................. H01J 5/16
[52] U.S. Cl. ............................ 250/227.15; 250/227.14; 356/34; 73/800
[58] Field of Search ......................... 250/227.15, 227.14; 137/12, 13, 137; 356/73.1, 34; 73/800

[56] References Cited

U.S. PATENT DOCUMENTS

| | | |
|---|---|---|
| 2,602,413 | 7/1952 | Miller . |
| 2,963,739 | 12/1960 | Whitehurst et al. . |
| 4,603,252 | 7/1986 | Malek et al. . |
| 4,636,638 | 1/1987 | Huang et al. . |
| 4,852,790 | 8/1989 | Karlinski . |
| 4,950,886 | 8/1990 | Claus et al. ........................ 250/227.14 |
| 5,028,111 | 7/1991 | Yumoto et al. . |
| 5,142,141 | 8/1992 | Talat et al. ......................... 250/227.15 |
| 5,283,852 | 2/1994 | Gibler et al. ............................. 385/137 |
| 5,338,928 | 8/1994 | Jamieson et al. . |
| 5,399,584 | 3/1995 | Dunphy et al. ............................ 73/800 |
| 5,422,974 | 6/1995 | Brown et al. ........................... 385/137 |

FOREIGN PATENT DOCUMENTS 63-230269  9/1988  Japan .

OTHER PUBLICATIONS

IOP Publishing Ltd., Smart Materials And Structures, vol. 1, 1992, pp. 156–161.

*Primary Examiner*—Edward P. Westin
*Assistant Examiner*—Jacqueline M. Steady
*Attorney, Agent, or Firm*—Bell, Seltzer, Park & Gibson

[57] ABSTRACT

A fracture detecting apparatus for identifying fractures in a metallic workpiece includes a fiber optic element securely affixed to the workpiece with a metallic material, such as a metallic solder. Accordingly, a fracture in the portion of the metallic workpiece to which the fiber optic element is attached will damage the fiber optic element. A light source and a detector are connected to the fiber optic element for transmitting light therethrough and receiving the transmitted light, respectively. The detector determines, based upon the reflection or attenuation of the transmitted light, if the fiber optic element has been damaged. Accordingly, a damaged fiber optic element as well as the fracture in the underlying metallic workpiece which caused the damage to the fiber optic element may be detected and repaired prior to causing additional damage to the metallic workpiece.

20 Claims, 2 Drawing Sheets

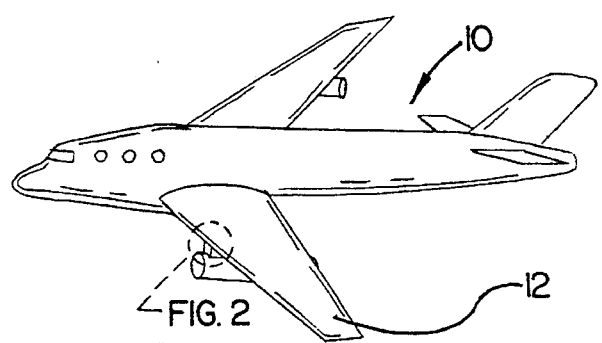
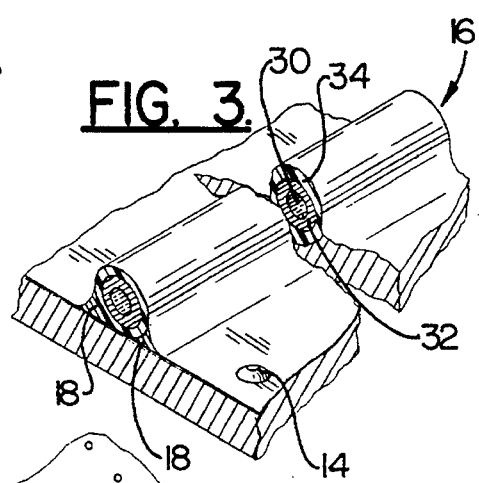
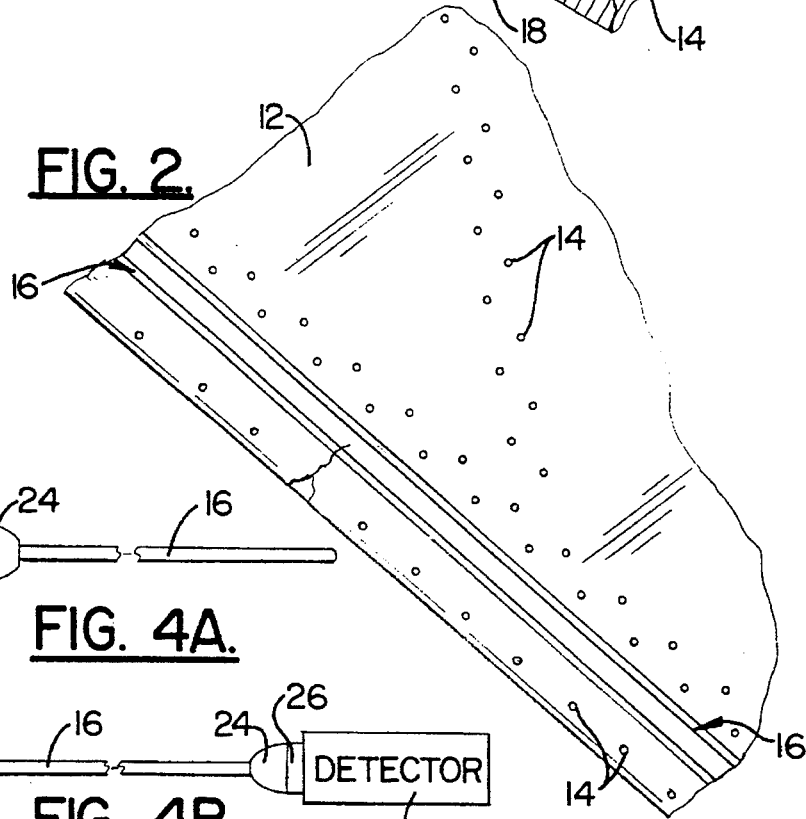
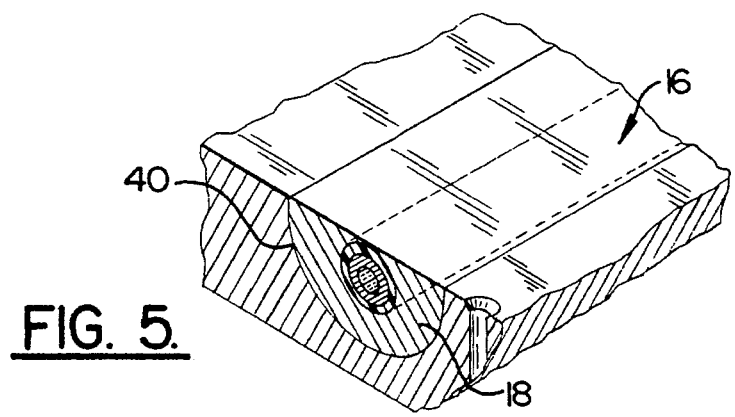

FIBER OPTIC SENSING APPARATUS FOR DETECTING A FRACTURE IN A METALLIC WORKPIECE AND AN ASSOCIATED METHOD OF ATTACHING A FIBER OPTIC SENSING ELEMENT TO THE METALLIC WORKPIECE

FIELD OF THE INVENTION

The present invention relates generally to fiber optic sensors and, more particularly, to fiber optic sensors for detecting a fracture in a workpiece.

BACKGROUND OF THE INVENTION

In many instances, it is desirable to detect a fracture or crack in a workpiece such that the workpiece may repaired before the fracture enlarges and creates additional damage to the workpiece. For example, the outer surfaces or skin of most modern aircraft are comprised of a metal and, more particularly, are comprised of aluminum. Although modern aircraft are constructed according to rigid specifications, the conditions under which aircraft operate and the forces on an aircraft during service may cause the outer surface of the aircraft to fracture. These fractures typically occur in areas which are loaded with the largest forces during service, such as the bulkhead and engine mounts, as well as structurally weakened areas. Such structurally weakened areas include joints at which adjacent panels have been joined, such as by a row of rivets.

Fractured workpieces may, in many instances, be repaired. The repair of a fractured workpiece is particularly effective if the fracture in the workpiece is detected while the fracture is relatively small and before the workpiece suffers additional structural damage. For example, a fracture along the bulkhead or engine mounts of an aircraft may be repaired without hindering the performance of the aircraft if the fracture is detected while it is relatively small.

Workpieces are typically inspected manually, such as by a visual inspection, to detect fractures. However, manual inspection and detection of fractures in a workpiece, particularly a relatively large workpiece such as an aircraft, is time consuming and expensive. Thus, fracture detecting systems have been developed which periodically inspect the surface of a workpiece to identify any fractures in the workpiece. For example, eddy current fracture detection methods utilize eddy current probes to detect fractures in a workpiece. In addition, ultrasonic fracture detection systems have been developed to detect fractures in a workpiece. Ultrasonic fracture detection systems can typically only detect fractures in the line of sight between the ultrasonic transmitter/receiver. Thus, fractures within workpieces of a complex shape may not be detected by such ultrasonic fracture detection systems. In addition, a workpiece is only subjected to eddy current or ultrasonic inspections periodically such that fractures which occur between the periodic inspections will not be detected until a subsequent inspection. Without repair, these undetected fractures will typically enlarge and cause additional structural damage to the workpiece prior to being detected during the subsequent inspection.

Accordingly, other types of fracture detecting systems which continually monitor a workpiece have been developed. Such fracture detecting systems include the remote optical crack sensing system disclosed in U.S. Pat. No. 4,636,638 (hereinafter the "'638 patent") which issued Jan. 13, 1987 to Shih L. Huang et al. The crack detecting system of the '638 patent includes an optical fiber mounted on stress risers upon the surface of a workpiece, such as an aileron of an aircraft. The stress risers are adhesively mounted on the workpiece and extend outwardly therefrom. The crack sensing system also includes a light source for introducing light at a first end of the optical fiber and a detector at a second end of the optical fiber, opposite the first end, for receiving the light transmitted therethrough.

According to the crack sensing system of the '638 patent, cracks in the surface of the workpiece alter the relative positions of the stress risers and break the optical fiber. The light transmitted through the optical fiber is attenuated by the break in the optical fiber. Thus, by identifying the attenuation of the transmitted light with the detector, a break in the optical fiber and a corresponding fracture in the workpiece may be detected.

The crack sensing system of the '638 patent extends above the surface of the workpiece due, in part, to the stress risers. Therefore, the crack sensing system of the '638 patent alters the profile of the workpiece. In many instances, however, it is not desirable to alter the profile of a workpiece by mounting thereon objects which extend outwardly from the surface of the workpiece. For example, it is not desirable to alter the profile of an aircraft, as defined by the outer surface of the aircraft, by mounting additional devices, such as a fracture sensing system, thereon since any alterations in the profile of the aircraft changes the performance characteristics of the aircraft.

Accordingly, optical fracture sensing systems have been developed which are mounted directly on the surface of a workpiece, such as the surface of an aircraft. One such optical fracture sensing system is described in a publication entitled *An Optical-Fibre Fatigue Crack-Detection and Monitoring System* by K. F. Hale which was published in the *Smart Materials and Structures*, Vol. 1, p. 156 (1992) (hereinafter the "Hale publication"). The optical fiber crack detection and monitoring system disclosed by the Hale publication includes optical fibers mounted directly on the surface of the workpiece. The optical fibers are mounted with a high-modulus adhesive such that fractures in a portion of the workpiece underlying the optical fiber will also crack the optical fiber. Once an optical fiber has cracked, light transmitted through the optical fiber will be attenuated and the fracture in the workpiece will be detected.

The high-modulus adhesive which bonds the optical fiber to the surface of the workpiece is generally an organic epoxy. Organic epoxies, however, have a different coefficient of thermal expansion than metal, such as aluminum. Accordingly, the organic epoxy may de-bond from a metallic workpiece as the workpiece expands and contracts during temperature fluctuations. Once the organic epoxy de-bonds from the workpiece, the optical fiber is no longer affixed to the workpiece and no longer reliably detects fractures in the workpiece.

In addition, metallic workpieces and, in particular, aluminium workpieces rapidly develop a surface oxide layer upon exposure to air. Organic epoxies, however, cannot readily bond to a workpiece covered with an oxide layer. Accordingly, the oxide layer must be removed from the surface of a workpiece, typically by chemically and mechanically cleaning and preparing the workpiece, in order to bond an optical fiber to the workpiece with an organic epoxy.

Organic epoxies also degrade upon exposure to ultraviolet radiation. In addition, organic epoxies are softened, and may dissolve, by contact with fuels, solvents or oils. Thus, organic epoxies which have degraded or softened may de-bond from the workpiece, such that the optical fiber is no longer bonded to the workpiece and will not detect fractures therein. Furthermore, upon repairing a workpiece, such as an aircraft, the step of stripping paint from the workpiece would also strip or remove the organic epoxy and de-bond the fiber optic from the workpiece.

Accordingly, it is desirable to detect fractures in a metallic workpiece such that the fractures may be repaired before the workpiece suffers additional damage. Some conventional fracture detecting systems, such as illustrated in the '638 patent, stand off or extend outwardly from the surface of the workpiece and significantly alter the profile of the workpiece, such as the profile of an aircraft. In addition, other fracture detecting systems, such as described in the Hale publication, bond optical fibers to a workpiece with a high-modulus adhesive, such as an organic epoxy, which may de-bond in certain conditions such that the optical fibers are no longer affixed to the workpiece and will not detect fractures therein.

SUMMARY OF THE INVENTION

In view of the foregoing background, it is an object of the present invention to provide an improved method and apparatus for detecting fractures in a metallic workpiece.

It is also an object of the present invention to provide an improved method and apparatus for attaching optical fibers to a metallic workpiece to detect fractures therein.

These and other objects are provided, according to the invention, by an apparatus for detecting a fracture in a metallic workpiece which includes a fiber optic element securely affixed to the workpiece with a metallic material such that a fracture in a portion of the workpiece to which the fiber optic element is attached will damage the fiber optic element. The fracture detecting apparatus also includes a light source, such as a laser diode or a light emitting diode, for transmitting light through the fiber optic element and detector means for receiving light transmitted through the fiber optic element and for determining if the fiber optic element is damaged. Therefore, a fracture in the workpiece which has damaged the fiber optic element may be detected and repaired, thus, preventing further damage to the metallic workpiece.

The fiber optic element has first and second opposed ends and includes an optical fiber surrounded by a cladding layer which, in turn, is surrounded by a metal coating which bonds to the metallic material. The metallic material is typically a metallic solder and, more particularly, a zinc solder. In addition, the melting temperature of the metallic solder is preferably less than the predetermined melting temperature of the workpiece such that the solder may be melted on the surface of the workpiece without significantly damaging the structural integrity of the underlying metallic workpiece. In one embodiment, the melting temperature of the metallic solder is preferably less than 400° C.

In one embodiment, the light source and the detector means are both connected to a first end of the fiber optic element. Accordingly, the detector means, preferably an optical time domain reflectometer detects light reflected within the fiber optic element, such as light reflected from a second end of the fiber optic element, opposite the first end, or from a damaged portion of the fiber optic element. By analyzing the reflections detected by the detector means, damage to the fiber optic element may be identified, as well as the fracture in the surface of the workpiece which caused the damage.

In another embodiment, the light source is connected to a first end of the fiber optic element and the detector means is connected to the opposed second end of the fiber optic element. Thus, the detector means detects light transmitted through the fiber optic element, including any attenuation of the light due to a damaged portion of the fiber optic element. Accordingly, the fracture in the workpiece causing the damage may also be identified.

The fiber optic element is preferably attached to the metallic workpiece by initially applying a molten metallic material in a predetermined pattern to the workpiece. The fiber optic element is disposed in the molten metallic material which is then cured to securely affix the fiber optic element to the workpiece. Thus, a subsequent fracture in a portion of the workpiece to which the fiber optic element is attached will also damage the fiber optic element. In order to further improve the adherence of the fiber optic element and the molten material to the workpiece, the workpiece and the fiber optic element are both preferably pre-soldered.

In one embodiment, the molten metallic material is preferably applied and the fiber optic element disposed therein by soldering the fiber optic element to the metallic workpiece. For example, the metallic material may be melted and the fiber optic element disposed therein by laser soldering in which a laser melts the solder in which the fiber optic element is disposed. Alternatively, the fiber optic element may be brazed to the metallic workpiece with the metallic material.

In addition, the metallic workpiece is preferably cleaned prior to applying the molten metallic material thereto. This cleaning includes a removal of oxide and dirt from the surface of the metallic workpiece to improve the adherence of the molten metallic material thereto. In one embodiment of the present invention, a groove is provided in the metallic workpiece. The molten metallic material is applied in the groove and the fiber optic element is disposed therein. The surface of the workpiece may then be finished, such as by sanding or painting, to provide a smooth contour without altering the profile of the workpiece.

Accordingly, the fracture detecting apparatus of the present invention includes a fiber optic element which is securely affixed to a metallic workpiece by a molten metallic material, such as solder. Since the workpiece and the solder are both metallic, the materials expand and contract similarly such that the fiber optic element remains bonded to the workpiece during temperature fluctuations. In addition, the secure bond formed by the metallic material between the fiber optic element and the metallic workpiece allows the workpiece to be serviced, such as painting, sand blasting or other types of resurfacing, or exposed to ultraviolet radiation, fuels and oils without de-bonding the optical fiber from the metallic workpiece. Thus, an enduring optical fiber fracture detecting system may be mounted on a metallic workpiece without altering the profile of the workpiece significantly, if at all.

BRIEF DESCRIPTION OF THE DRAWINGS

FIG. 1 is a perspective view of an aircraft having a metallic outer surface or skin.

FIG. 2 is a detailed perspective view of a portion of the leading edge of a wing of the aircraft illustrated in FIG. 1 which illustrates the placement of a fiber optic element of the fiber optic fracture detecting system of the present invention.

FIG. 3 is a detailed perspective view of a fiber optic element of the present invention damaged by a fracture in a metallic workpiece.

FIGS. 4A and 4B schematically illustrate fracture detecting apparatuses according to the present invention which operate in reflection and transmission modes, respectively.

FIG. 5 is a perspective view of a fiber optic element of a fracture detecting apparatus according to the present invention which is disposed within a groove defined in the surface of the workpiece.

DETAILED DESCRIPTION OF THE PREFERRED EMBODIMENTS

Figures 6A, 6B:
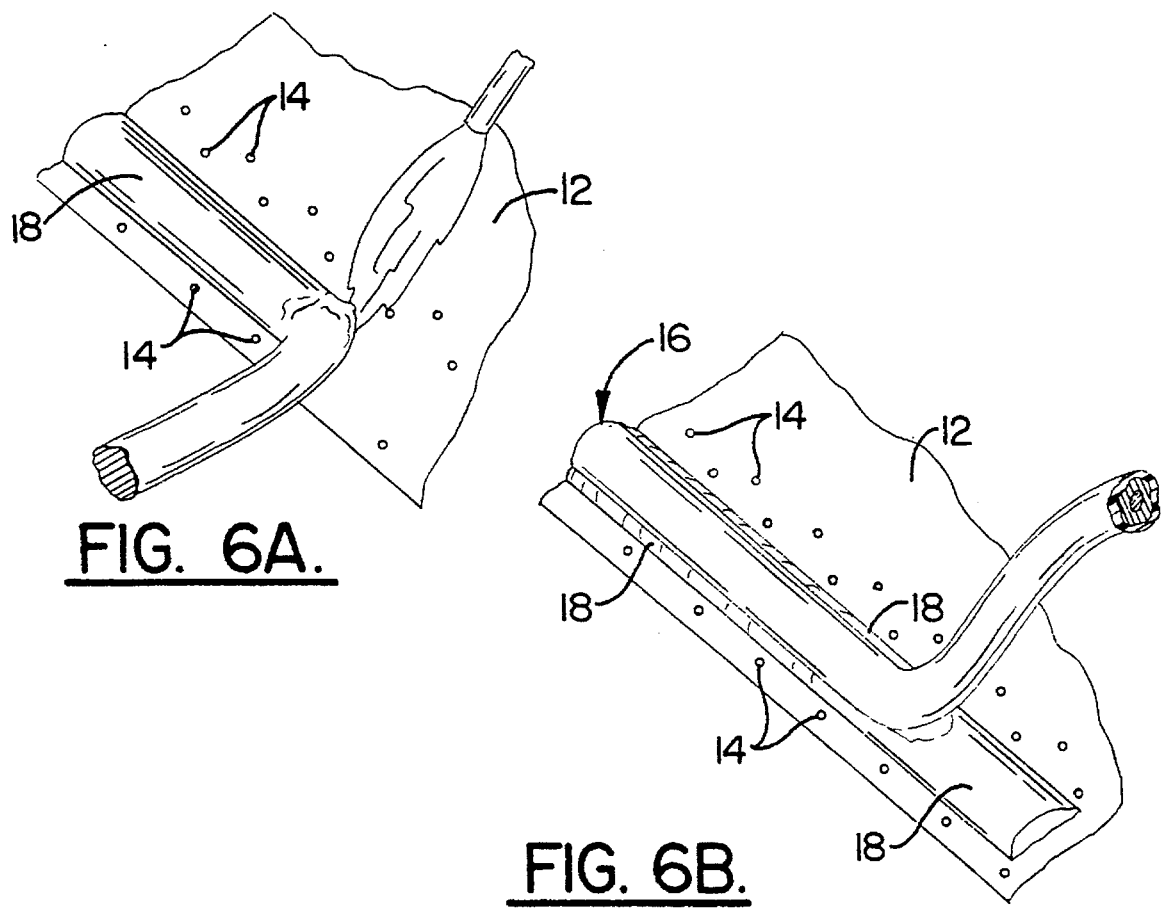
FIGS. 6A and 6B are fragmentary perspective views of a workpiece illustrating the application of molten metallic material to the workpiece and the placement of the fiber optic element therein, respectively.

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

The fiber optic fracture detecting apparatus of the present invention may be disposed upon and detect fractures in a variety of metallic workpieces. One type of a metallic workpiece upon which a fiber optic fracture detecting apparatus of the present invention may be employed is an aircraft 10, as illustrated in FIG. 1. The fiber optic fracture detecting apparatus is preferably located in areas in which fractures are most common, such as areas which are subjected to the most stress during service, and areas in which it is desirable to readily detect any such fractures to prevent further damage.

One portion of an aircraft 10 which is subjected to relatively high levels of stress during service is the engine mounts and pressurized bulkheads of an aircraft as shown in FIG. 2. It is also desirable to readily detect fractures in the engine mounts and pressurized bulkheads, for example, to prevent additional structural damage to the aircraft 10. As shown in FIG. 2, a plurality of rivets 14 or a weld typically join the different portions or panels which form the engine mounts and the pressurized bulkheads. The rivets 14 or weld weaken the surrounding portions of the skin of the aircraft 10 in comparison to the remainder of the surface of the wing 12 and, consequently, fractures are more likely to originate in the vicinity of the rivets 14 or weld. Accordingly, as illustrated in FIG. 2, one or more fiber optic elements 16 of the sensing apparatus of the present invention are preferably disposed along a line of rivets 14 on the engine mounts and pressurized bulkheads of an aircraft 10 in order to detect fractures in the underlying metallic skin or welded infrastructure.

The fiber optic fracture detecting apparatus of the present invention includes the fiber optic element 16 which is securely affixed to the metallic workpiece with a metallic material 18 such that a fracture in the portion of the workpiece to which the fiber optic element 16 is attached will also damage, and typically fracture or break, the fiber optic element 16 as shown in FIG. 3. In one embodiment, the fiber optic element is positioned perpendicular to the probable direction of a fracture, as shown in FIG. 2, in order to detect a greater percentage of fractures in the surface of the workpiece.

A light source 20 is connected to a first end of the fiber optic element 16 for transmitting light therethrough. In addition, a detector means 22 is also connected to the fiber optic element 16 for receiving light transmitted through the fiber optic element 16 and for detecting attenuation of the transmitted light within the fiber optic element 16. Thus, a fracture in a portion of the workpiece to which the fiber optic element 16 is attached and the resulting damage to the fiber optic element 16 itself will attenuate the transmitted light such that the fracture in the workpiece may be detected.

As also illustrated in FIG. 3, the fiber optic element 16 preferably includes an optical fiber core 30 surrounded by a cladding layer 32 which is typically comprised of a glass having a lower index of refraction than the optical fiber core 30. The cladding layer 32 is, in turn, surrounded by a metal coating 34 which bonds with the metallic material 18 that attaches the fiber optic element 16 to the surface of the metallic workpiece to further improve the adherence of the fiber optic element 16 to the workpiece. Accordingly, the metal coating 34 is preferably comprised of the same metal as the underlying workpiece. Thus, for an aluminum workpiece, the metal coating 34 is also preferably aluminum.

While a variety of fiber optic elements 16 may be employed in the fiber optic fracture detecting system without departing from the spirit and scope of the present invention, one exemplary fiber optic element 16 is a SuperGuide G which is an aluminum coated optical fiber sold by Fiberguide Industries as AS9-0450-41. The SuperGuide G fiber optic element has an optical fiber, a cladding layer and a metal coating having outer diameters of 100 micrometers, 110 micrometers and 160 micrometers, respectively. Another exemplary fiber optic element 16 which may be employed in the fracture detecting apparatus of the present invention is the single mode, step index 1,300 nanometer optical fiber sold by Fiberguide Industries as part number ASI9.5/125A. This fiber optic element has an optical fiber, a cladding layer and a metal coating having outer diameters of 9.5 micrometers, 125 micrometers and 175 micrometers, respectively.

The fiber optic element 16 is securely affixed to the metallic workpiece with a metallic material 18. According to the method of the present invention, molten metallic material 18 is preferably initially applied in a predetermined pattern to the surface of the workpiece as illustrated in FIG. 6A. The fiber optic element 16 is disposed in the molten metallic material 18, as shown in FIG. 6B, which is then solidified, such as by metallic thermal conduction or air cooling, to securely affix the fiber optic element 16 to the workpiece. Preferably, the molten metallic material 18 is applied to the workpiece and the fiber optic element 16 disposed therein by soldering or brazing the fiber optic element 16 to the workpiece with the metallic material 18.

In order to melt the metallic material 18 so that the fiber optic element 16 may be disposed therein without significantly damaging the structural integrity of the underlying metallic workpiece, the metallic material 18 preferably has a melting temperature less than the melting temperature of the metal comprising the workpiece and, most preferably, has a melting temperature of less than about 400° C. For example, the metallic material 18 may be a solder, such as a zinc based solder. Exemplary zinc based solders include a solder comprised of 88% zinc, 10% aluminum and 2% copper. Alternatively, the solder may be comprised of 15% zinc and 85% tin or the solder may be comprised of 42% zinc, 8% cadmium and 50% tin. These solders have melting temperatures of approximately 380°–390° C., 190°–200° C. and 180° C., respectively.

In one embodiment of the invention, the molten metallic material 18 is applied to the workpiece and the fiber optic element 16 is disposed therein by laser soldering the fiber optic element 16 to the metallic workpiece. By laser soldering the fiber optic element 16 to the workpiece, a laser melts the metallic material 18 without imparting significant energy to the metallic workpiece and, thus, does not impair the structural integrity of the metallic workpiece.

The metallic workpiece upon which the fiber optic fracture detecting apparatus of the present invention is disposed typically has a relatively large coefficient of thermal expansion. For example, the coefficient of thermal expansion of an aluminum workpiece, such as the skin of an aircraft 10, is $25 \times 10^{-6}$. Accordingly, the metallic material 18 with which the fiber optic element 16 is affixed to the workpiece also preferably has a relatively large coefficient of thermal expansion such that the metallic material 18 in the underlying workpiece will expand and contract similarly during temperature fluctuations to prevent de-bonding of the metallic material 18 and the fiber optic element 16 from the underlying workpiece.

Since metallic workpieces and, in particular, aluminum workpieces rapidly develop a surface layer of oxide upon exposure to air, the method of attaching the fiber optic element 16 to the metallic workpiece of the present invention preferably removes or destroys the oxide layer prior to or during the attachment of the fiber optic to the workpiece. For example, a metallic material 18 or solder having flux, such as an acid based organic flux, will remove or destroy the surface oxide layer once it is applied to the workpiece in the process of adhering to the metallic workpiece. Alternatively, for fiber optic elements 16 adhered to a metallic workpiece by a fluxless metallic material 18 or solder, such as solder comprised of 88% zinc, 10% aluminum and 2% copper, the surface oxide layer is preferably physically thinned or removed prior to applying the metallic material 18 to the workpiece to further enhance the adherence of the fiber optic element 16 thereto. For example, the surface oxide layer may be removed by scraping the surface, such as with a brazing rod formed of the solder, while melting the solder and brazing the fiber optic element 16 to the metallic workpiece.

In order to further improve the adherence of the fiber optic element 16 to the metallic workpiece, the fiber optic element 16 and/or the workpiece are preferably pre-soldered by depositing a relatively thin layer of the metallic material 18 or solder on the fiber optic element 16 and workpiece. By pre-soldering the fiber optic element 16 and the workpiece, the oxide layer is removed or destroyed. Accordingly, by remelting the layer of metallic material deposited on the workpiece, the fiber optic element 16 may be readily disposed therein and adhered thereto.

In one embodiment of the invention illustrated schematically in FIG. 4A, the light source 20 and the detector means 22 are both connected to the first end of the fiber optic element 16 and operate in a reflection mode. In this embodiment, the detector means 22 detects light reflected within the fiber optic element 16. For example, the light may be reflected from the second end of the fiber optic element 16, opposite the first end or from a damaged portion of the fiber optic cable.

As illustrated in FIG. 4A, the first end of the fiber optic element 16 may be connected, such as with a coupler 24, to a fiber optic cable. In this are also connected to an opposed end of the fiber optic element 16.

Accordingly, the light source 20 and detector means 22 need not be located in the vicinity of the fiber optic element 16, but may be located at a remote location, such as a central control unit of an aircraft 10.

One exemplary detector means 22 which operates in a reflection mode is an optical time domain reflectometer for receiving the light transmitted through and reflected within the fiber optic element 16. In this embodiment, the light source 20 preferably transmits a light pulse through the fiber optic element 16. The optical time domain reflectometer receives a reflection of the light pulse and determines the time elapsed between the transmission of the light pulse by the light source 20 and its receipt of the reflected pulse.

For a fiber optic element 16 of a predetermined length, the time required for the light pulse to be transmitted through the fiber optic element 16, reflected from the second end of the fiber optic element 16 and detected by the optical time domain reflectometer may be determined. Thus, based upon the predetermined length of time for reflection of the light pulse from the second end of the fiber optic element 16 and the elapsed time required for reflection of the light pulse transmitted by the light source 20, the optical time domain reflectometer can determine if the light pulse was reflected from the second end of the fiber optic element 16 or from a damaged or broken portion of the fiber optic element 16. For example, reflections from a damaged or broken portion of the fiber optic element 16 would be less than the time required for reflection of the light pulse from the second opposed end of the fiber optic element 16. In addition, based upon the time elapsed between the transmission of the light pulse and the received reflection, the locations of the damaged portion of the fiber optic element 16 and the fracture of the underlying metallic workpiece which damaged the fiber optic element 16 may be determined. Thereafter, the fiber optic element 16 and the underlying metallic workpiece may be repaired before the workpiece is further damaged.

In another embodiment illustrated in FIG. 4B, the light source 20 is connected to a first end of the fiber optic element 16 and the detector is connected to the second opposed end of the fiber optic element 16. The light source 20 and detector are preferably connected to fiber optic cables which are connected, such as via respective couplers 24, to opposed ends of the fiber optic element 16. Thus, the light source 20 and the detector need not be physically located near the fiber optic element 16, but may be located elsewhere as described hereinabove.

In this embodiment, the light source 20 also preferably transmits a light pulse through the optical fiber core 30. The detector, operating in a transmission mode, receives the light transmitted through the optical fiber core 30 and, based upon the predetermined intensity of the light pulse transmitted by the light source 20, determines the attenuation of the detected light. Fiber optic elements 16 which have been damaged, such as by a fracture in the underlying metallic workpiece, will significantly attenuate the light transmitted therethrough. Accordingly, by detecting the attenuation of the transmitted light, a damaged fiber optic element 16 and a fracture in the underlying metallic workpiece which damaged the fiber optic element 16 may be located and repaired.

Another embodiment of the invention is illustrated in FIG. 5 in which a groove 40 is formed in the surface of the workpiece. The molten metallic material 18 is applied in the groove 40 and the fiber optic element 16 is disposed therein. The surface of the workpiece may then be finished, such as by sanding or painting, to provide a smooth contour without altering the profile of the workpiece.

According to the present invention, a fiber optic element 16 may be securely affixed with a metallic material 18 to a metallic workpiece such that a fracture in the metallic workpiece will damage the fiber optic element 16. Accordingly, light transmitted through the fiber optic element 16 will be attenuated and reflected such that the damaged fiber optic element 16 and the fracture in the underlying metallic workpiece may be located and repaired without causing additional damage to the workpiece.

The fiber optic fracture detecting system of the present invention is preferably disposed either on or within a groove 40 in the surface of the metallic workpiece and, consequently, does not substantially alter the profile of the workpiece. In addition, the metallic material 18 securely affixes the fiber optic element 16 to the metallic workpiece such that the metallic material 18 and the fiber optic element 16 will not de-bond during temperature fluctuations or during repair or refinishing of the surface of the aircraft 10, such as painting, sand blasting or other types of resurfacing. Still further, the metallic material 18 which affixes the fiber optic element 16 to the metallic workpiece does not significantly degrade when subjected to ultraviolet radiation and is not dissolved or otherwise softened by contact with fuels, solvents or oils. Accordingly, a durable fiber optic fracture detecting apparatus is disclosed which is securely affixed to the metallic workpiece with a metallic material 18.

In the drawings and specification there have been disclosed typical preferred embodiments of the invention and, although specific terms are employed, the terms are used in a generic and descriptive sense only and not for purposes of limitation, the scope of the invention being set forth in the following claims.

That which is claimed is:

1. An aerodynamic apparatus for detecting a fracture in a metallic workpiece comprising:

a continuous fiber optic element disposed on a surface of the metallic workpiece such that said continuous fiber optic element does not significantly alter the aerodynamic profile of the metallic workpiece;

metallic material disposed about said continuous fiber optic element to securely affix said fiber optic element directly to the surface of the workpiece such that a fracture in any portion of the workpiece along which said continuous fiber optic element is disposed will damage the fiber optic element;

a light source, connected to said fiber optic element, for transmitting light therethrough; and detector means, connected to said fiber optic element, for receiving light transmitted through said continuous fiber optic element and for determining that the fiber optic element is damaged, such that a fracture in the workpiece is detected.

2. The fracture detecting apparatus according to claim 1 wherein the metallic workpiece has a first predetermined melting temperature, and wherein said metallic material has a second predetermined melting temperature less than the first predetermined melting temperature.

3. The fracture detecting apparatus according to claim 2 wherein the second predetermined melting temperature of said metallic material is less than 400° C.

4. The fracture detecting apparatus according to claim 1 wherein said metallic material is a zinc solder.

5. The fracture detecting apparatus according to claim 1 wherein said fiber optic element comprises:

an optical fiber;

a cladding layer surrounding said optical fiber; and a metal coating surrounding said cladding layer wherein said metal coating bonds with said metallic material.

6. The fracture detecting apparatus according to claim 1 wherein said fiber optic element has first and second opposed ends, and wherein said light source and said detector means are connected to the first end of the fiber optic element, such that said detector means detects light reflected from damaged portions of said fiber optic element.

7. The fracture detecting apparatus according to claim 6 wherein said detector means is an optical time domain reflectometer for receiving light transmitted through and reflected within said fiber optic element.

8. The fracture detecting apparatus according to claim 1 wherein said fiber optic element has first and second opposed ends, and wherein said light source is connected to the first end of the fiber optic element and said detector means is connected to the second end of said fiber optic element, such that said detector means receives light transmitted through said fiber optic element and detects attenuation of the light introduced by damaged portions of said fiber optic elements.

9. The fracture detecting apparatus according to claim 1 wherein said light source is selected from the group consisting of a light emitting diode and a laser diode.

10. An aerodynamic apparatus for detecting fractures comprising:

a metallic workpiece;

a continuous fiber optic element disposed on a surface of said metallic workpiece such that said continuous fiber optic element does not significantly alter the aerodynamic profile of said metallic workpiece; and metallic material disposed about said continuous fiber optic element to securely affix said fiber optic element directly to the surface of said workpiece such that a fracture in any portion of said workpiece along which said continuous fiber optic element is disposed will damage said fiber optic element.

11. The fracture detecting apparatus according to claim 10 wherein said metallic workpiece has a first predetermined melting temperature, and wherein said metallic material has a second predetermined melting temperature less than the first predetermined melting temperature.

12. The fracture detecting apparatus according to claim 10 further comprising:

a light source, connected to said fiber optic element, for transmitting light therethrough; and a detector, connected to said fiber optic element, for receiving light transmitted through said fiber optic element and determining that the fiber optic element is damaged, such that a fracture in said workpiece is detected.

13. A method of attaching a fiber optic element to the surface of a metallic workpiece such that fractures in the workpiece may be detected, the method comprising the steps of:

applying a molten metallic material directly to the surface of the workpiece;

disposing a continuous fiber optic element in the molten metallic material such that the continuous fiber optic element does not significantly alter the aerodynamic profile of said metallic workpiece; and curing the metallic material to securely affix the continuous fiber optic element directly to the surface of the workpiece such that a subsequent fracture in any portion of the workpiece to which the continuous fiber optic element is attached will damage the fiber optic element.

14. The method of attaching a fiber optic element to a metallic workpiece according to claim 13 wherein said applying step comprises the step of presoldering the workpiece and the fiber optic element.

15. The method of attaching a fiber optic element to a metallic workpiece according to claim 13 wherein said applying step includes the step of applying solder in a predetermined pattern to the workpiece.

16. The method of attaching a fiber optic element to a metallic workpiece according to claim 13 further comprising the step of soldering the fiber optic element to the metallic workpiece along a predetermined pattern wherein said soldering step includes said applying and disposing steps.

17. The method of attaching a fiber optic element to a metallic workpiece according to claim 16 wherein said soldering step includes the step of laser soldering the fiber optic element to the metallic workpiece wherein a laser melts the solder in which the fiber optic element is disposed.

18. The method of attaching a fiber optic element to a metallic workpiece according to claim 13 further comprising the step of brazing a fiber optic element to a metallic workpiece along a predetermined pattern wherein said brazing step includes said applying and disposing steps.

19. The method of attaching a fiber optic element to a metallic workpiece according to claim 13 further comprising the step of providing a groove in the metallic workpiece, wherein the molten metallic material is applied in the groove and the fiber optic element is disposed in the groove.

20. The method of attaching a fiber optic element to a metallic workpiece according to claim 13 further comprising the step of cleaning the metallic workpiece prior to applying the molten metallic material to the workpiece, wherein said cleaning step includes the step of removing oxide from the surface of the metallic workpiece.

* * * * *